United States Patent
Lin et al.

(10) Patent No.: US 10,169,160 B2
(45) Date of Patent: Jan. 1, 2019

(54) DATABASE BATCH UPDATE METHOD, DATA REDO/UNDO LOG PRODUCING METHOD AND MEMORY STORAGE APPARATUS

(71) Applicant: Industrial Technology Research Institute, Hsinchu (TW)

(72) Inventors: Hung-Hsuan Lin, Hsinchu County (TW); Tzi-Cker Chiueh, Taipei (TW); Jhen-Ting Jhang, Hualien County (TW)

(73) Assignee: Industrial Technology Research Institute, Hsinchu (TW)

( * ) Notice: Subject to any disclaimer, the term of this patent is extended or adjusted under 35 U.S.C. 154(b) by 474 days.

(21) Appl. No.: 14/983,500

(22) Filed: Dec. 29, 2015

(65) Prior Publication Data
US 2017/0177444 A1 Jun. 22, 2017

(30) Foreign Application Priority Data
Dec. 21, 2015 (CN) .......................... 2015 1 0961962

(51) Int. Cl.
G06F 3/06 (2006.01)
G06F 11/14 (2006.01)
G06F 17/30 (2006.01)

(52) U.S. Cl.
CPC ........ *G06F 11/1451* (2013.01); *G06F 3/0619* (2013.01); *G06F 3/0659* (2013.01);
(Continued)

(58) Field of Classification Search
CPC ...... G06F 3/061; G06F 3/0611; G06F 3/0613; G06F 3/0655; G06F 3/0656; G06F 3/0659
See application file for complete search history.

(56) References Cited

U.S. PATENT DOCUMENTS 5,432,922 A * 7/1995 Polyzois ............. G06F 11/1666
707/999.202
6,976,022 B2 12/2005 Vemuri et al.
(Continued)

FOREIGN PATENT DOCUMENTS

TW I238330 8/2005
TW I453623 9/2014
(Continued)

OTHER PUBLICATIONS

Mohan, C., et al. "ARIES: a transaction recovery method supporting fine-granularity locking and partial rollbacks using write-ahead logging." ACM Transactions on Database Systems (TODS) 17.1 (1992): 94-162. (Year: 1992).*
(Continued)

*Primary Examiner* — William Spieler
(74) *Attorney, Agent, or Firm* — JCIPRNET

(57) ABSTRACT

A database batch update method is provided. The method includes: receiving a data access command which requires to access data from a first memory; determining whether the data access command is a first type or a second type command; storing the first type command in a second memory, and access the data from a third memory in response to the second type command; sequentially accessing the first memory according to the data access command stored in the second memory in an order of physical addresses of the first memory. The sequential access rate of the first memory is larger than the random access rate of the first memory, wherein the terms "sequential" and "random" are in connection with the physical addresses of the first memory. Furthermore, a data redo/undo log producing method and a memory storage apparatus are also provided.

16 Claims, 8 Drawing Sheets

(52) U.S. Cl.
CPC .......... *G06F 3/0665* (2013.01); *G06F 3/0685* (2013.01); *G06F 17/30185* (2013.01); *G06F 17/30345* (2013.01)

(56) References Cited

U.S. PATENT DOCUMENTS

| | | | |
|---|---|---|---|
| 6,981,004 | B2 | 12/2005 | Ganesh et al. |
| 6,983,322 | B1 | 1/2006 | Tripp et al. |
| 7,801,932 | B2 | 9/2010 | Krishnaswamy |
| 8,108,521 | B2 | 1/2012 | Greven et al. |
| 8,429,444 | B2 | 4/2013 | Rancurel et al. |
| 8,719,841 | B2 | 5/2014 | Pinto et al. |
| 2002/0004799 | A1 | 1/2002 | Gorelik et al. |
| 2004/0236869 | A1 | 11/2004 | Moon |
| 2006/0137010 | A1 | 6/2006 | Kramer et al. |
| 2006/0195336 | A1 | 8/2006 | Greven et al. |
| 2010/0228951 | A1 | 9/2010 | Liu |
| 2013/0042156 | A1* | 2/2013 | Srinivasan .......... G06F 11/1443 714/54 |
| 2015/0186297 | A1 | 7/2015 | Lashley et al. |

FOREIGN PATENT DOCUMENTS

| | | |
|---|---|---|
| WO | 2006023990 | 3/2006 |
| WO | 2008103530 | 8/2008 |

OTHER PUBLICATIONS

Campello, Daniel, et al. "Non-blocking Writes to Files." FAST. 2015. (Year: 2015).*

Polyzois, Christos A., Anupam Bhide, and Daniel M. Dias. "Disk mirroring with alternating deferred updates." VLDB. 1993. (Year: 1993).*

Yu, Xiang, et al. "Trading capacity for performance in a disk array." Proceedings of the 4th conference on Symposium on Operating System Design & Implementation—vol. 4. USENIX Association, 2000. (Year: 2000).*

Dilip N Simha, et al., "An Update-Aware Storage System for Low-Locality Update-Intensive Workloads," Proceedings of the 17th International Conference on Architectural Support for Programming Languages and Operating Systems, ASPLOS 2012, Mar. 3-7, 2012, pp. 1-12.

Dilip Nijagal Simha, "Efficient Implementation Techniques for Block-Level Cloud Storage Systems," PhD Thesis, Stony Brook University, May 2014, pp. 1-243.

Steven Pelley, et al., "Storage Management in the NVRAM Era," Proceedings of the VLDB Endowment VLDB Endowment Hompage archive, vol. 7, Issue 2, Oct. 2013, pp. 121-132.

Tsukasa Kudo, et al., "An implementation of concurrency control between batch update and online entries," Procedia Computer Science vol. 35, Sep. 2014, pp. 1625-1634.

Jian Huang, et al., "NVRAM-aware Logging in Transaction Systems," Proceedings of the VLDB Endowment VLDB Endowment Hompage archive, vol. 8, Issue 4, Dec. 2014, pp. 389-400.

Laurynas Biveinis, et al., "MainMemory Operation Buffering for Efficient RTree Update," Proceedings of the 33rd international conference on Very large data bases, VLDB 2007, Sep. 2007, pp. 591-602.

"Office Action of Taiwan Counterpart Application", dated Aug. 25, 2016, p. 1-p. 3.

* cited by examiner

DATABASE BATCH UPDATE METHOD, DATA REDO/UNDO LOG PRODUCING METHOD AND MEMORY STORAGE APPARATUS

CROSS-REFERENCE TO RELATED APPLICATION

This application claims the priority benefit of China application serial no. 201510961962.8, filed on Dec. 21, 2015. The entirety of the above-mentioned patent application is hereby incorporated by reference herein and made a part of this specification.

BACKGROUND OF THE DISCLOSURE

Field of the Disclosure

The disclosure relates to a database update method, a data redo/undo method and a memory storage apparatus, and particularly relates to an interleaving database batch update method.

Description of Related Art

Conventionally, a database used by a computer is to store data in a hard drive. The hard drive refers to a non-volatile storage device based on a hard rotary disk, in which a magnetic head close to a magnetic surface is used to store and retrieve digital data on the flat magnetic surface, and during a write operation, the digital data is written on the magnetic disc through an electromagnetic flow in a polarity changing manner. The stored data can be read in a reverse manner, for example, when the magnetic head passes over the stored data, the magnetic field causes a change of electrical signal in a coil. The hard drive includes one or more high speed rotating magnetic disks and the magnetic head disposed on an actuator arm. Therefore, although the read operation of the hard driver may read data stored in the hard disk in any order, when the magnetic head seeks a location of the required data and accesses the required data, it has to spend a seek time, a rotation time and an access time.

Each time when a data access command is executed to the database, the data in the hard disk has to be updated. Namely, the magnetic head of the hard disk has to be physically moved to the location of the data to be accessed each time when the command is executed, so that a conventional data access rate of the database is largely limited by access efficiency of the hard disk.

Therefore, it becomes an important issue of the field to accelerate the access rate of the database. A method for improving the hard disk access efficiency is, for example, to adopt a sequential access method. Since the magnetic head on the actuator arm has to be moved to the location where the data is stored during each data access operation, if the location of the data in each data access operation is not largely changed, the seek time and the rotation time spent during the movement of the magnetic head can be greatly decreased, so as to improve the access rate of the database.

SUMMARY OF THE DISCLOSURE

A plurality of embodiments of the disclosure is directed to a database batch update method, a data redo/undo log producing method and a memory storage apparatus, in which the database batch update method is adapted to improve access efficiency of a hard disk when a database is accessed, so as to improve access efficiency of the database. Moreover, when the database is required to implement a redo/undo operation, the redo/undo operation is implemented according to the data redo/undo log producing method provided by the disclosure.

A plurality of embodiments of the disclosure provides a database batch update method, which includes following steps. A plurality of data access commands is sequentially received, where the data access commands require to access at least one data from a first memory. It is determined whether the data access commands belong to a first type command or a second type command. The data access commands belonging to the first type command are stored in a second memory. The at least one data corresponding to the data access commands belonging to the second type command is accessed from a third memory. The first memory is sequentially accessed according to the data access commands stored in the second memory in an order of physical addresses of the first memory, where the at least one data corresponds to at least one first storage partition of the first memory. The third memory is mirrored to the first memory before the data access commands are sequentially received, where an access rate of sequential physical addresses in the first memory is larger than an access rate of random physical addresses in the first memory, and an access rate of sequential physical addresses in the third memory is larger than an access rate of random physical addresses in the third memory.

A plurality of embodiments of the disclosure provides a data redo/undo log producing method, which includes following steps. A data access command is received, where the data access command requires to access data from a first memory. The data access command is stored in a second memory, and a data redo log corresponding to the data access command is produced. The first memory is accessed according to the data access command stored in the second memory, and a data undo log corresponding to the data access command is produced, where the data to be accessed by the data access command corresponds to one of at least one first storage partition of the first memory, where an access rate of sequential physical addresses in the first memory is larger than an access rate of random physical addresses in the first memory.

A plurality of embodiments of the disclosure provides a data storage apparatus including a first memory, a second memory, a third memory and a processing unit. The first memory is a non-volatile memory. The second memory is a volatile memory. The third memory is a non-volatile memory. The processing unit is operatively coupled to the first memory, the second memory and the third memory, and is configured to sequentially receive a plurality of data access commands, where the data access commands require to access at least one data from the first memory. The processing unit determines whether the data access commands belong to a first type command or a second type command, and stores the data access commands belonging to the first type command in the second memory, and accesses the data corresponding to the data access commands belonging to the second type command from the third memory. The processing unit sequentially accesses the first memory according to the data access commands stored in the second memory in an order of physical addresses of the first memory. The data to be accessed by the data access commands corresponds to at least one first storage partition. The third memory is mirrored to the first memory before the processing unit sequentially receives the data access commands. An access rate of sequential physical addresses in the first memory and the third memory is larger than an access rate of random physical addresses in the first memory and the third memory.

According to the above description, in a plurality of embodiments of the disclosure, a data interleaving access manner is adopted to respectively execute the data access commands of different types by using different memories. In this way, during a memory sequential access process, a sequential data access process is not interrupted by the data access command requiring to return data in real-time, so as to effectively maintain a characteristic of memory sequential access and improve database access efficiency.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
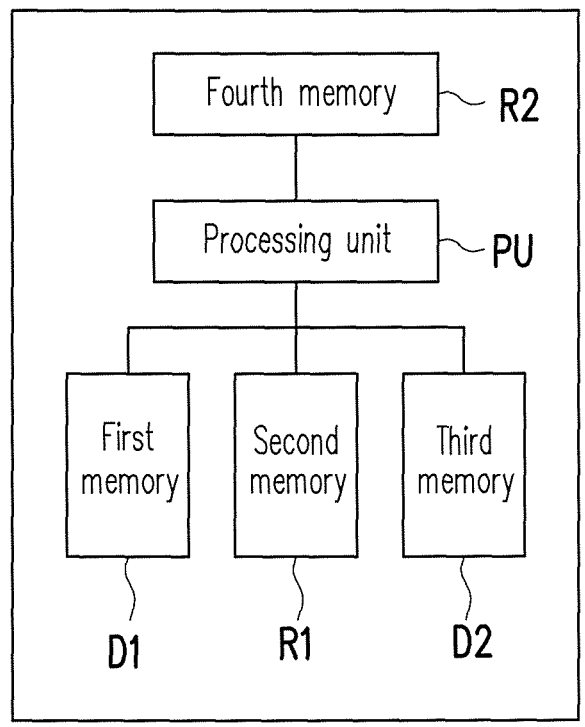
FIG. 1 is a schematic diagram of a memory storage apparatus according to an embodiment of the disclosure.

FIG. 1 is a schematic diagram of a memory storage apparatus according to an embodiment of the disclosure.

Referring to FIG. 1, the memory storage apparatus 10 includes a first memory D1, a second memory R1, a third memory D2, a fourth memory R2 and a processing unit PU. The processing unit PU is operatively coupled to the first memory D1, the second memory R1, the third memory D2 and the fourth memory R2, and is configured to control a whole operation of the memory storage apparatus 10. The processing unit PU is, for example, a micro-controller, an embedded controller, a central processing unit (CPU) or a similar device, and the type of the processing unit PU is not limited by the disclosure.

The first memory D1 and the third memory D2 are non-volatile memories, and data stored therein is not automatically disappeared when the power is off. Moreover, the first memory D1 and the third memory D2 are sequential access memories, i.e., a sequential access rate on physical addresses of the first memory D1 and the third memory D2 is larger than a random access rate thereof. In an embodiment of the disclosure, the first memory D1 and the third memory D2 can be hard disks, magnetic disks, optical disks or magnetic tapes, etc., which is not limited by the disclosure. The second memory R1 and the fourth memory R2 are volatile memories, and data stored therein is automatically disappeared and cannot be maintained when the power is off. Moreover, the second memory R1 and the fourth memory R2 are random access memories, and in an embodiment of the disclosure, the second memory R1 and the fourth memory R2 are, for example, cache memories used for a central processor, for example, static random access memories (SRAM). In another embodiment of the disclosure, the second memory R1 and the fourth memory R2 can also be dynamic random access memories (DRAM). Alternatively, in an embodiment of the disclosure, the second memory R1 is the DRAM and the fourth memory R2 is the SRAM. In brief, under a premise that the memories are complied with a required volatile condition and access rate, the types of the memories are not limited by the disclosure.

FIG. 2 including FIGS. 2a-2f are schematic diagrams illustrating a flow of a database batch update method according to an embodiment of the disclosure. FIG. 3 is a flowchart illustrating a database batch update method according to an embodiment of the disclosure.

Figure 2A:
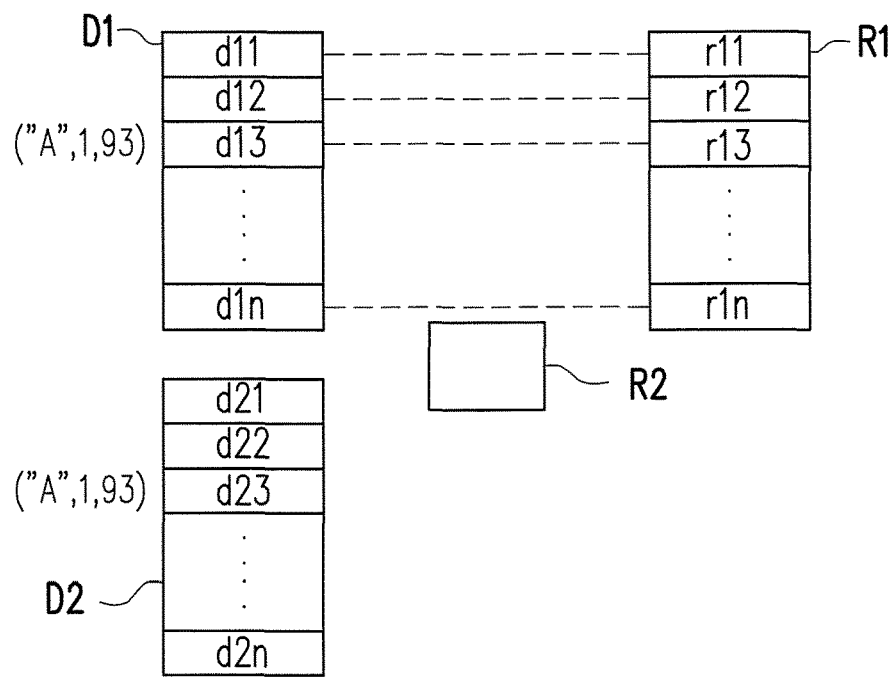
FIGS. 2a-2f are schematic diagrams illustrating a flow of database batch update according to an embodiment of the disclosure.
Figure 3:
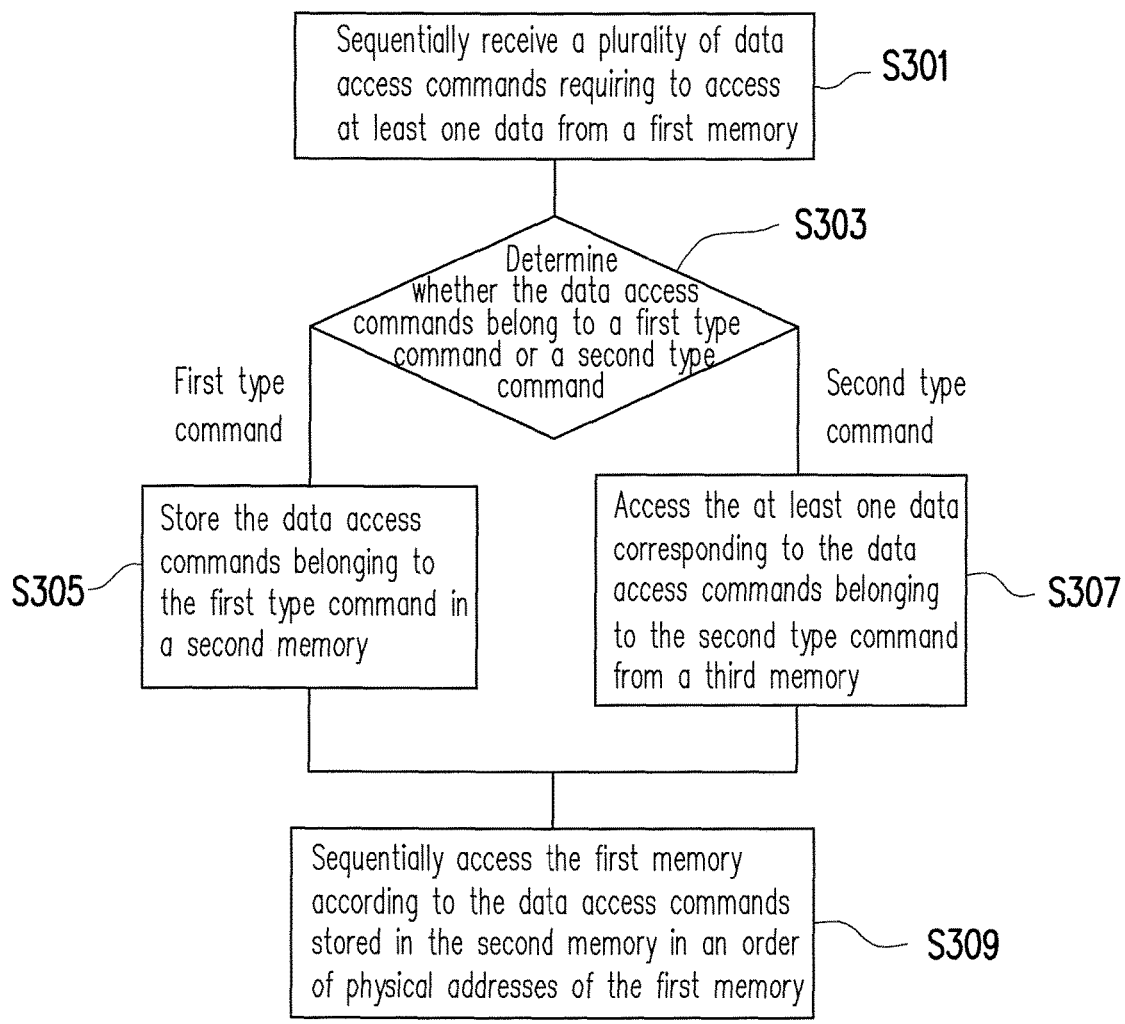
FIG. 3 is a flowchart illustrating a database batch update method according to an embodiment of the disclosure.

Referring to FIG. 2a, in an embodiment of the disclosure, the first memory D1 is divided into a plurality of storage partitions d11-d1n, where the storage partition d13 stores data with data content of ("A", 1, 93). The third memory D2 is the same and can be used to replace the first memory D2, and at least includes the same number of storage partitions d21-d2n one-to-one corresponding to that of the first memory D1, and the storage partition d23 of the third memory D2 also stores data with the data content of ("A", 1, 93). In an embodiment of the disclosure, the second memory R1 at least includes the same number of storage partitions r11-r1n one-to-one corresponding to that of the first memory D1.

In an embodiment of the disclosure, an order of the storage partitions of the first memory D1 or the third memory D2 is equivalent to an order of physical addresses in the memory. For example, if the first memory D1 is a hard disk, the physical addresses of physical sectors included in the storage partition d12 thereof are greater than the physical addresses of physical sectors included in the storage partition d11, and are smaller than physical addresses of physical sectors included in the storage partition d13. It should be noted that the aforementioned storage partitions are not the smallest write units of the memory, for example, if the first memory D1 is the hard disk, one storage partition thereof may include one sector, two sectors or more sectors, etc., and since the second memory R1 is the random access memory, one storage partition thereof may include one physical page, three physical pages or one physical block, etc., and a corresponding relationship between the storage partitions of the second memory R1 and the storage partitions of the first memory D1 or the third memory D2 can be established through a hash table, which is not limited by the disclosure.

Figure 2B:
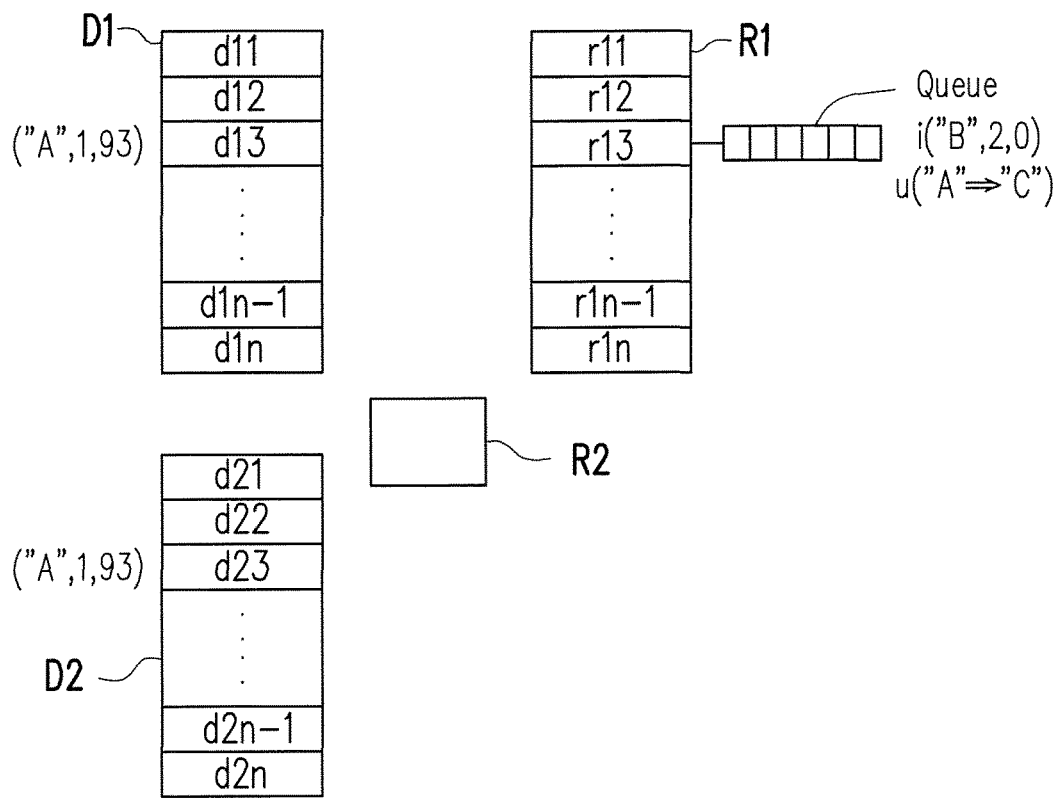

Referring to FIG. 2b and FIG. 3, after the processing unit (not shown) receives data access commands (step S301), the processing unit determines whether the received data access commands belong to a first type command or a second type command (step S303). In an embodiment of the disclosure, the first type command is, for example, a data update command such as a write command, a modify command or a erase command, etc., namely, the first type command is a command required to process the stored data, but is unnecessary to return data content in real-time; and the second type command is, for example, a read command, i.e., the second type command is a command required to return data content after reception. The data storage commands belonging to the first type command which is unnecessary to return data content in real-time are stored in a memory queue of the second memory R1 (step S305).

For example, as shown in FIG. 2b, when the processing unit sequentially receives a write command i("B", 2, 0) and a modify command u("A"=>"C") for accessing the data ("A", 1, 93) in the storage partition d13, the above two data update commands are sequentially stored in the memory queue of the storage partition r13 of the second memory R1. Moreover, if the received data access command belongs to the read command or the second type command, the received data access command is not stored to the second memory R1. To be specific, in an embodiment of the disclosure, regarding the data access command belonging to the read command or the second type command, the third memory D2 is used to execute the access operation, and a detailed operation process is described below. It should be noted that in an embodiment of the disclosure, a first-in-first-out (FIFO) manner is adopted for accessing the aforementioned memory queue.

After a predetermined time, the processing unit sequentially accesses the first memory D1 according to the data access commands stored in the second memory R1 in an order of the storage partitions of the first memory D1 (step S309). In an embodiment of the disclosure, the aforementioned predetermined time is, for example, a time for receiving a predetermined number of the data access commands or a predetermined time interval, which is not limited by the disclosure.

In an embodiment of the disclosure, the storage partition d11 in the first memory D1 is first accessed, and the processing unit may check whether the memory queue of the storage partition r11 of the second memory R1 stores the data access command. If the memory queue of the storage partition r11 of the second memory R1 stores a data access command, the processing unit accesses the storage partition d11 of the first memory D1 according to the stored data access command. If the memory queue of the storage partition r11 of the second memory R1 does not store the data access command, the processing unit further accesses the storage partition d12 of the first memory D1, and repeats the aforementioned operations to sequentially access the storage partitions of the first memory D1. In an embodiment of the disclosure, after the processing unit completes accessing the storage partition d1n of the first memory D1, the processing unit may continually access the storage partition d1n-1 of the first memory D1 according to a reverse order of the storage partitions, so as to maintain a sequential access of the first memory D1. In another embodiment of the disclosure, after the processing unit completes accessing the last storage partition d1n of the first memory D1, the processing unit may return to the storage partition d11 to repeat the aforementioned forward sequential access operation, which is not limited by the disclosure. In following descriptions, the storage partition d13 of the first memory D1 is taken as an example to describe a method for accessing the first memory D1 according to the data access commands stored in the second memory R1.

Figure 2C:
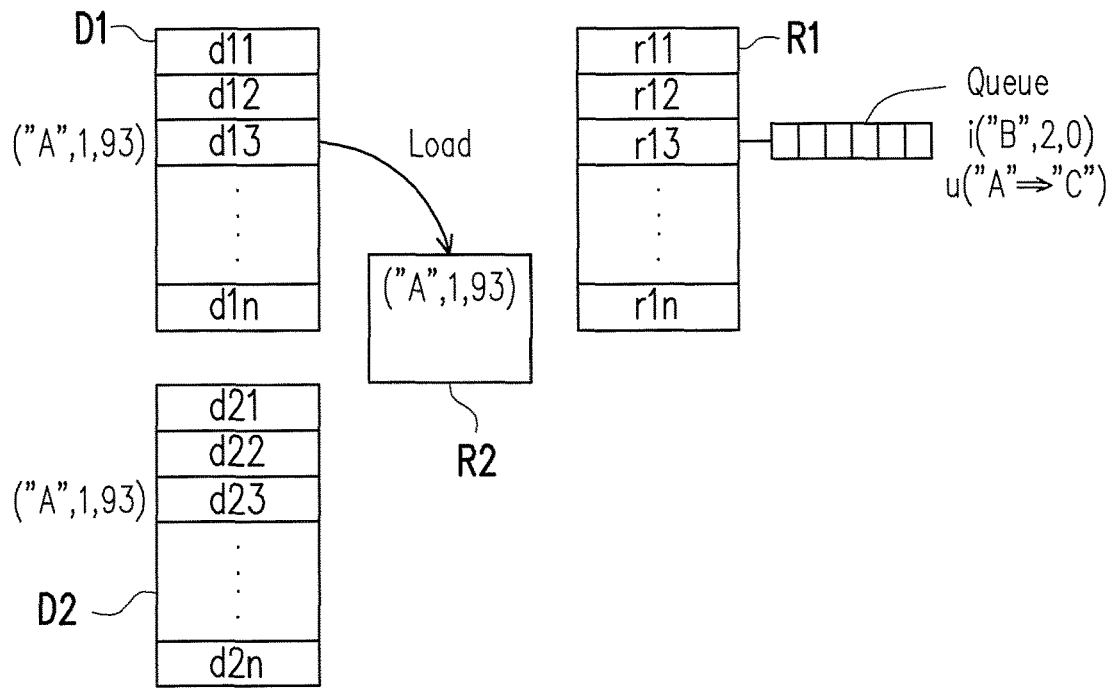
Figure 2D:
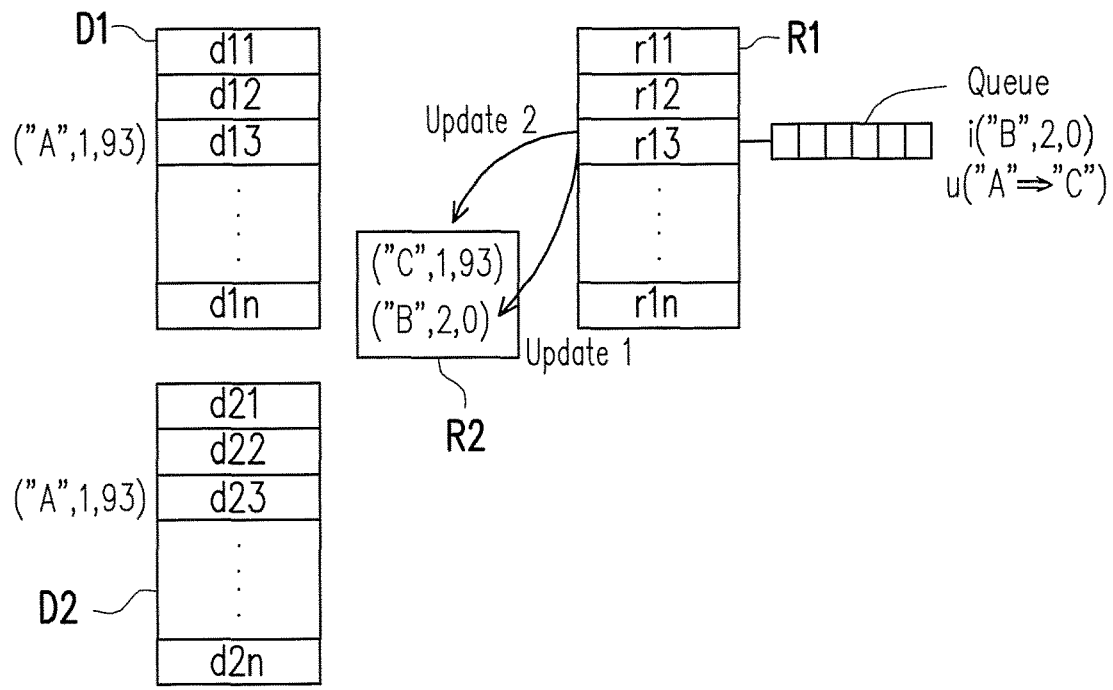
Figure 2E:
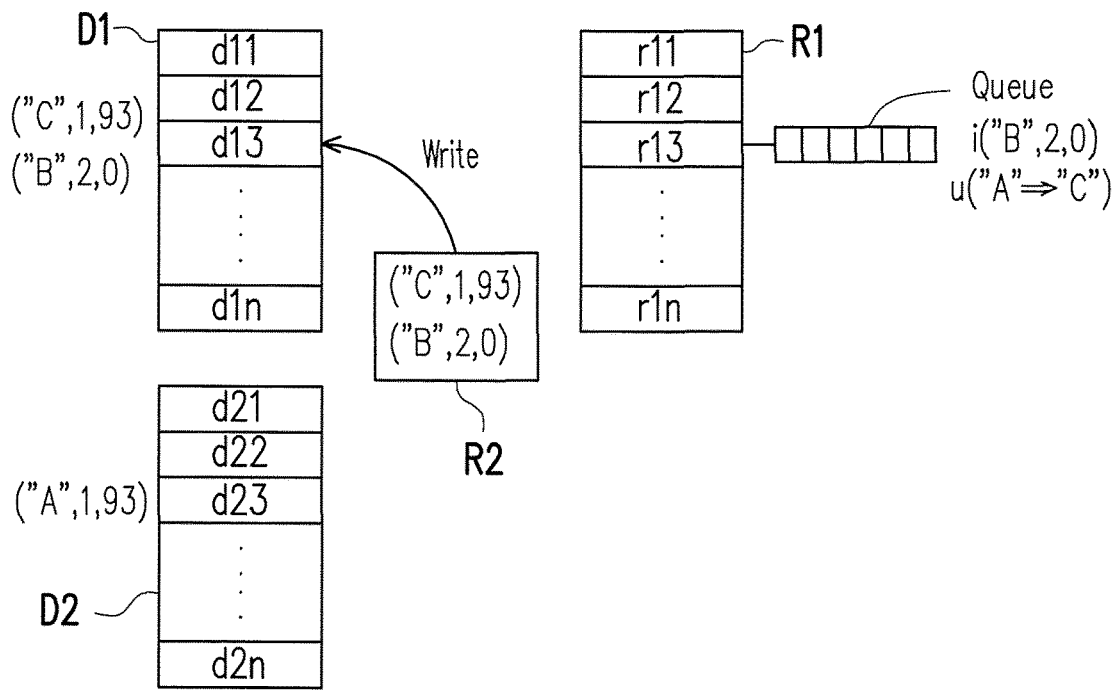

Referring to FIG. 2c-FIG. 2e, as shown in FIG. 2c, the memory queue of the storage partition r13 of the second memory R1 stores the write command i("B", 2, 0) and the modify command u("A"=>"C"). The data stored in the storage partition d13 of the first memory D1 is first loaded to the fourth memory R2, and as shown in FIG. 2d, the write command i("B", 2, 0) and the modify command u("A"=>"C") are sequentially executed in the FIFO manner according to the order of storing the same into the memory queue of the storage partition r13 to update the data in the fourth memory R2. After the aforementioned commands are executed, the data in the fourth memory R2 is updated to ("C", 1, 93) and ("B", 2, 0). Thereafter, as shown in FIG. 2e, the data in the fourth memory R2 is written back, i.e., the data ("C", 1, 93) and ("B", 2, 0) stored in the fourth memory R2 are written into the storage partition d13 of the first memory D1, so as to complete the operation of accessing the storage partition d13 of the first memory D1. In an embodiment of the disclosure, after access of the storage partition d13 is completed, data of the storage partition d14 is further accessed.

Referring to the step S303 of FIG. 3, in an embodiment of the disclosure, when the processing unit determines that the received data access command belongs to the second type command, the data access command is not stored in the second memory R1. In step S307, the processing unit accesses the data corresponding to the received data access command belonging to the second type command in the third memory D2. Therefore, in an itransaction situation, the data stored in the third memory D2 is synchronous to the data stored in the first memory D1.

It should be noted that in the aforementioned database batch update method, the third memory D2 is used for real-time access of data according to the data access command belonging to the second type command, and the first memory D1 is used for sequential access of data according to the data access command belonging to the first type command in the second memory, though the disclosure is not limited thereto. For example, in an embodiment of the disclosure, the first memory D1 and the third memory D2 can be alternately used in a time interleaving manner through data interleaving access.

Figure 2F:
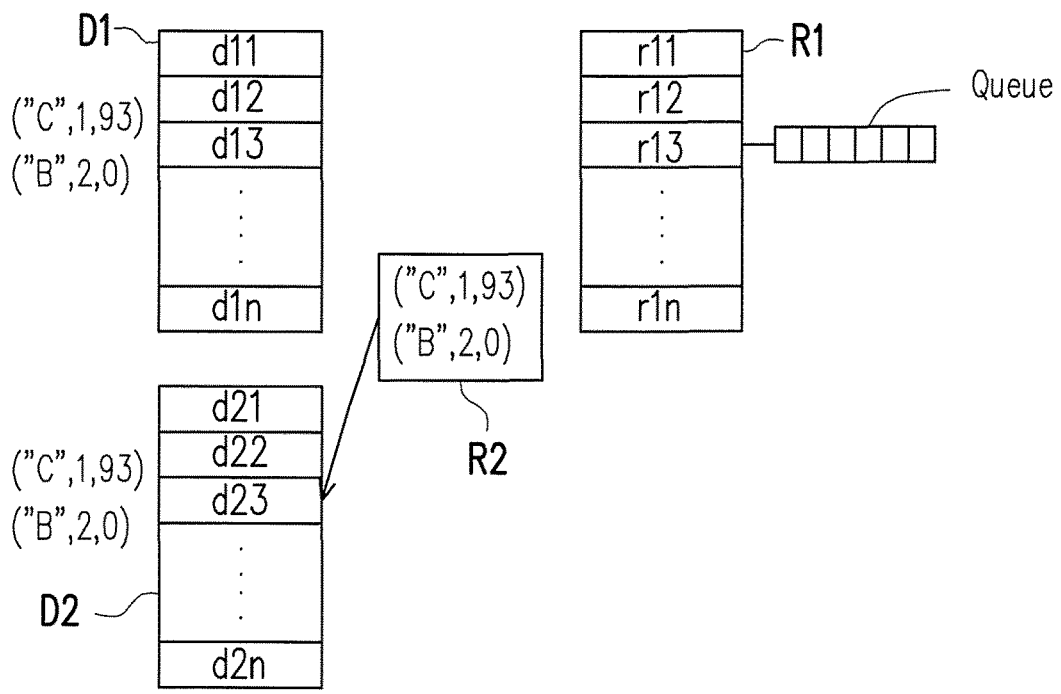

Referring to FIG. 2e and FIG. 2f, in an embodiment of the disclosure, as show in FIG. 2e, after the data of the storage partition d13 is updated, the storage partition d23 of the third memory D2 still maintains the data content of ("A", 1, 93) without being updated. According to the aforementioned method, after the predetermined time, the processing unit sequentially updates the third memory D2 in an order of the physical addresses of the third memory D2, and after the write command i("B", 2, 0) and the modify command u("A" "C") in the memory queue of the storage partition r13 have been used for accessing the third memory D2 according to the aforementioned method, the first type commands stored in the memory queue of the storage partition r13 are erased, as shown in FIG. 2f.

Figure 4:
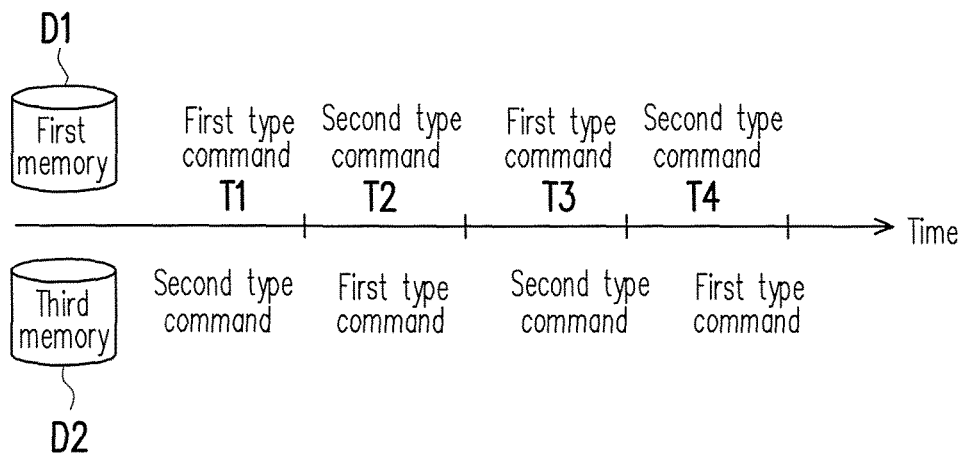
FIG. 4 is a schematic diagram of data interleaving access according to an embodiment of the disclosure.

FIG. 4 is a schematic diagram of data interleaving access according to an embodiment of the disclosure. Namely, as shown in FIG. 4, during time intervals T1 and T3, the third memory D2 is used for real-time access of data according to the data access commands belonging to the second type command, and the first memory D1 is used for sequential access of data according to the data access commands belonging to the first type command in the second memory R1; during time intervals T2 and T4, the first memory D1 is used for real-time access of data according to the data access commands belonging to the second type command, and the third memory D2 is used for sequential access of data according to the data access commands belonging to the first type command in the second memory R1. When the processing unit accesses the first memory D1 or the third memory D2 according to the specific data access commands in the second memory R1, the processing unit further records that the aforementioned specific data access commands have been used for accessing the first memory D1 or the third memory D2. When the aforementioned specific data access commands have been used for accessing the first memory D1 and the third memory D2, it represents that the specific data access commands are no longer usable, and the processing unit erases the specific data access commands from the second memory R1.

Figure 5A:
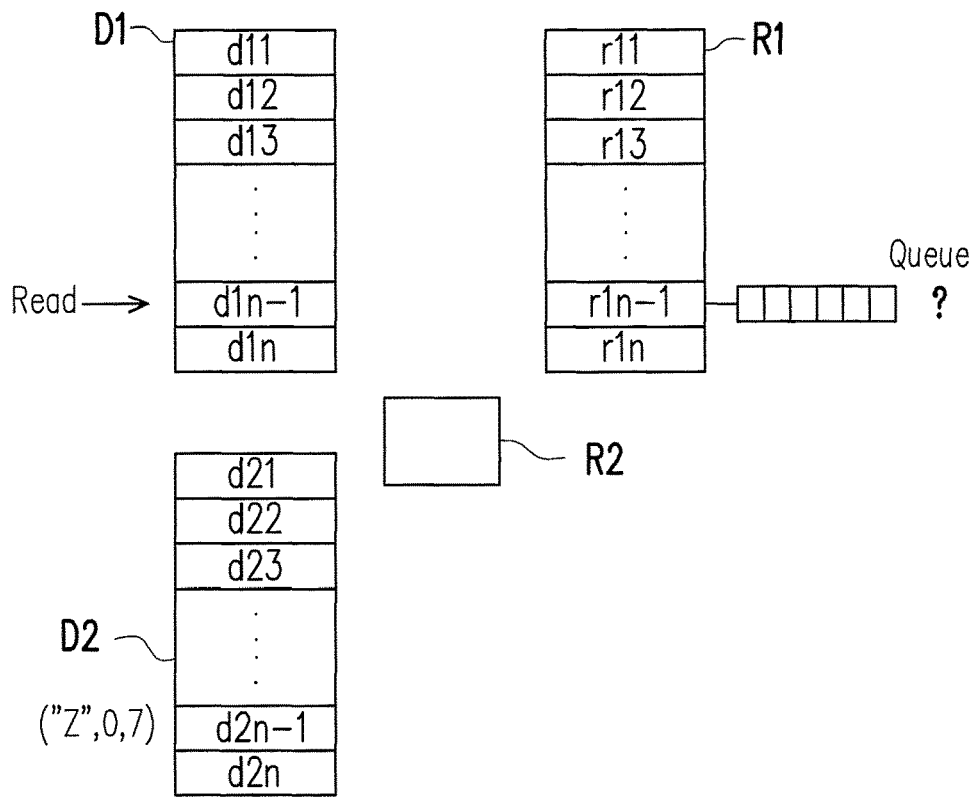
FIG. 5a-5b is a schematic diagram illustrating a flow of accessing data corresponding to data access commands belonging to the second type command from a third memory according to an embodiment of the disclosure.
Figure 5B:
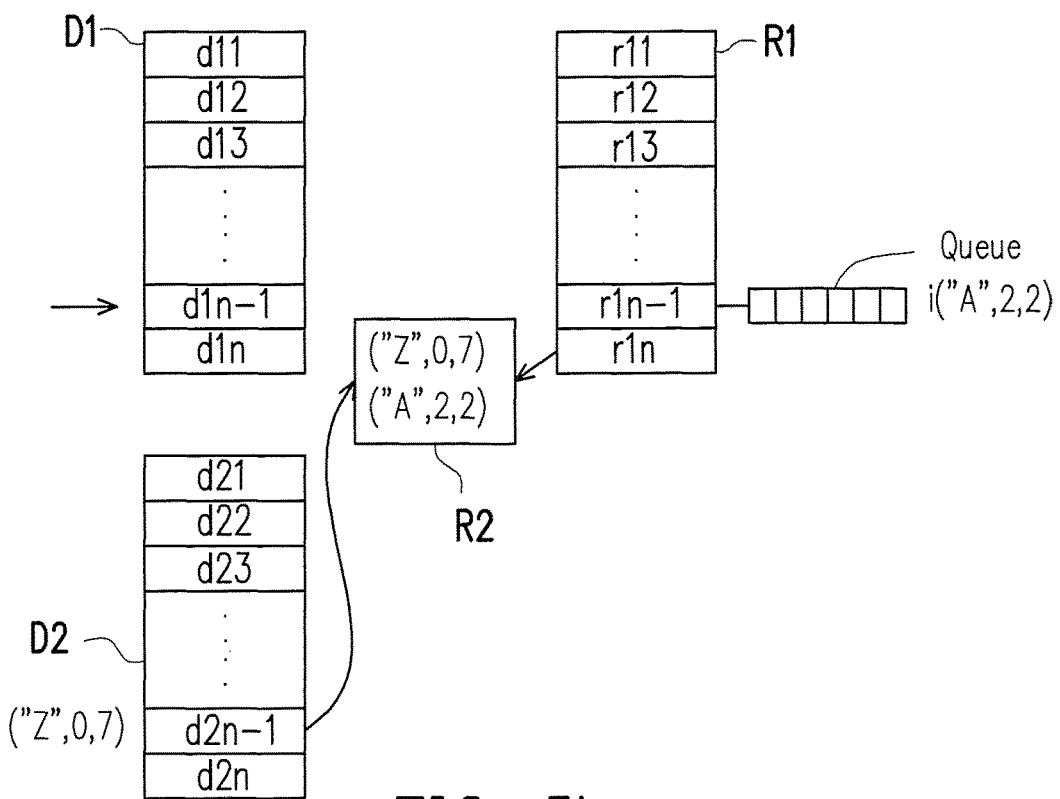

FIG. 5 (including FIG. 5a and FIG. 5b) is a schematic diagram illustrating a flow of accessing data corresponding to the data access command belonging to the second type command from the third memory according to an embodiment of the disclosure.

Referring to FIG. 4 and FIG. 5, in an embodiment of the disclosure, the processing unit receives a read command requiring reading data in the storage partition d1n-1 of the first memory D1. Since the read command is a data access command belonging to the second type command, the processing unit correspondingly reads data in the storage partition d2n-1 of the third memory D2 according to the received read command.

Taking the schematic diagram of FIG. 5a as an example, since the first memory D1 and the third memory D2 are alternately used in the time interleaving manner, during a period between a time point of receiving an update command for accessing the data in the storage partition d1n-1 and a time point of receiving a read command for accessing the data in the storage partition d1n-1, the storage partition d1n-1 or the storage partition d2n-1 is probably not accessed. In this way, when the processing unit wants to read the data of the storage partition d2n-1 of the third memory D2 according to the received read command, the processing unit first inspects whether the memory queue in the storage partition r1n-1 of the second memory R1 has a data update command that is not yet used for accessing the third memory D2. If yes, as shown in FIG. 5b, the data ("Z", 0, 7) of the storage partition d2n-1 is first loaded to the fourth memory R2, and the data loaded to the fourth memory R2 is updated to latest data according to the data access command stored in the memory queue of the storage partition r1n-1 of the second memory R1, and then the latest data in the fourth memory R2 is returned to respond the received read command.

In the present embodiment, the latest data returned to respond the received read command is ("Z", 0, 7) and ("A", 2, 2). On the other hand, if the memory queue in the storage partition r1n-1 of the second memory R1 does not have the data update command that is not yet used for accessing the third memory D2, it represents that the data in the storage partition d2n-1 is the latest data, and the data ("Z", 0, 7) in the storage partition d2n-1 can be directly used for responding the received read command.

In brief, the database batch update method provided by the embodiment of the disclosure is to use the first memory D1 and the third memory D2 to separately take charge of the received two types of data access commands respectively belonging to the first type command and the second type command, where the data access command belonging to the first type command requires to update the data in the database without returning data in real-time; and the data access command belonging to the second type command requires to return the data in the database in real-time without performing data update. By using the database batch update method provided by the embodiment of the disclosure, the characteristic of fast sequential access of the first memory D1 or the third memory D2 (for example, a hard disk) is maintained, and the process of sequential access is not interrupted by the data access command requiring returning data in real-time. Meanwhile, in the embodiment of the disclosure, after the data access command belonging to the first type command is received, data access from the first memory D1 or the third memory D2 is not immediately executed, instead, the received data access command belonging to the first type command is first stored to the memory queue of the second memory R1.

When the database executes a batch of transaction including a plurality of data access commands, a transaction process can be aborted by the user at anytime for requesting to go back to a status before the transaction, or a program of the database has a problem during the transaction process, and after the program is executed, it is required to go back to the normal state. If the transaction has been committed, all of the executed commands in the transaction process have to be normally completed, and if the transaction is not yet committed, all of the executed commands in the transaction process have to go back to the status before execution. To achieve these functions, the database requires to record a data redo log and a data undo log during an execution process. The data undo log requires to use a data pre-image, i.e., the data has not been updated, and in the database batch update method of the embodiment of the disclosure, when a data access command of a front end is received, the data access command is regarded to be completely executed by storing the data access command belonging to the first type command in the memory queue, during which the data is stored in the first memory D1 or the third memory D2 without being accessed, and it has not chance to obtain the state before the data is updated, i.e., the data pre-image, so that the data undo log cannot be produced, and a conventional data undo method of the database cannot be implemented, i.e., it is unable to simultaneously produce the data redo log and the data undo log. A data redo/undo log producing method and a data undo method are provided below in an embodiment of the disclosure with reference of following figures, which can be effectively applied to the database batch update method of the disclosure.

Figure 6:
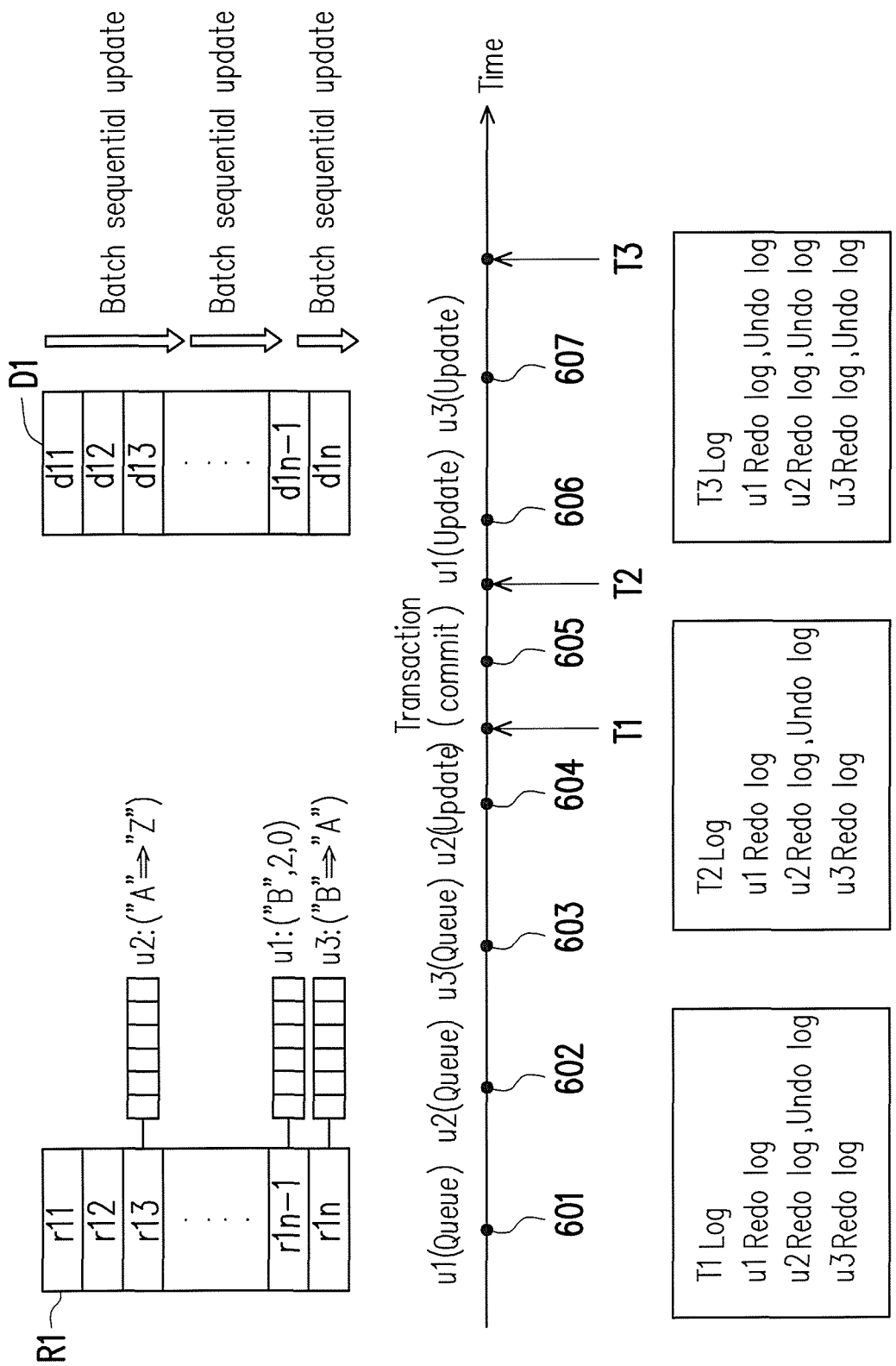
FIG. 6 is a schematic diagram illustrating a flow of a data redo/undo log producing method according to an embodiment of the disclosure.
Figure 7:
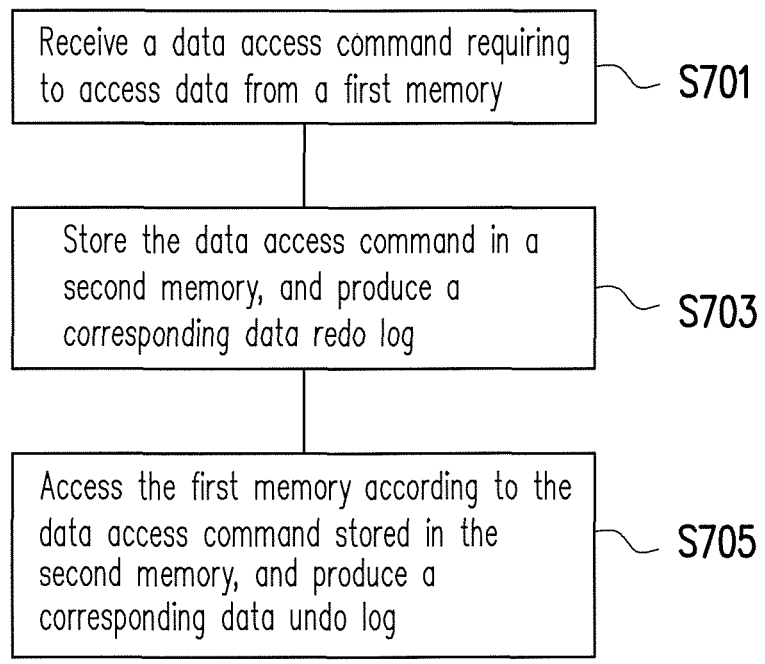
FIG. 7 is a flowchart illustrating the data redo/undo log producing method according to an embodiment of the disclosure.

FIG. 6 is a schematic diagram illustrating a flow of a data redo/undo log producing method according to an embodiment of the disclosure. FIG. 7 is a flowchart illustrating the data redo/undo log producing method according to an embodiment of the disclosure.

Referring to FIG. 6 and FIG. 7, in an embodiment of the disclosure, the processing unit receives the data access commands including data update commands u1:i("B", 2, 0), u2:u("A"=>"Z") and u3:u("B"=>"A") (step S701), where u1, u2 and u3 all belong to the first type command, and are respectively stored to the memory queues of the corresponding storage partitions in the second memory R1 at time points 601, 602 and 603 (step S703), where the method for storing the data access commands of the first type command to the memory queue of the storage partition of the second memory R1 has been introduced in the aforementioned embodiment, so that details thereof are not repeated. As described above, the storage partition d13 of the first memory D1 corresponding to the data update command u2 is updated at a time point 604 in priority, and the data update commands u1, u3 are executed at time points 606 and 607. In an embodiment of the disclosure, since data is not really accessed from the first memory D1 at the time points 601, 602 and 603, the data undo log including the data pre-image cannot be produced, only data redo logs corresponding to the data update commands u1, u2 and u3 are produced at the time points 601, 602 and 603 (step S703). At the time point 604, the data update command u2 is executed in priority. As described above, since the data in the storage partition d13 of the first memory D1 is first loaded to the fourth memory R2 during the update process, the data pre-image before update can be simultaneously obtained to produce the data undo log of the data update command u2 at the time point 604. Similarly, the data undo logs of the data update commands u1 and u3 are also produced at the time point 606 and 607 (step S705).

In an embodiment of the disclosure, the data redo log may include the corresponding data update command, and the data undo log may include the data pre-image of the corresponding data update command. For example, the data undo log produced at the time point 602 may include the data redo log: i("B", 2, 0) corresponding to the data update command u1 and the data redo log: u2: u("A"=>"Z") corresponding to the data update command u2, and the data undo log produced at the time point T2 further includes the data redo log: u("B"=>"A") corresponding to the data update command u3 and the data undo log: ("A", 1, 93) corresponding to the data update command u2. However, the disclosure is not limited thereto, and the data redo logs and the data undo logs may include other information required in the data undo process according to an actual requirement.

Referring back to FIG. 6, according to the above data undo log producing method, at the time point T1, the data undo log may include the data redo logs of the data update commands u1, u2 and u3 and the data undo log of the data update command u2. At the time point T2, the data undo log may include the data redo logs of the data update commands u1, u2 and u3 and the data undo log of the data update command u2. At the time point T3, the data undo log may include the data redo logs and the data undo logs of the data update commands u1, u2 and u3. A transaction request of the aforementioned data update commands is committed at the time point 605. Different embodiments are provided below to respectively describe the undo methods for database program damage at the time points T1, T2 and T3.

In an embodiment of the disclosure, the database program is damaged at the time point T1. At the time point T1, the transaction is not yet committed, so that data in the database has to be recovered to a state before the data update commands u1, u2 and u3 of the transaction request are executed. Since only the data update command u2 in the date update commands u1, u2 and u3 updates the first memory D1, and the date update commands u1 and u3 do not complete the update, as long as the data pre-image in the data undo log of the data update command u2 is used to undo the data in the storage partition d13 of the first memory D1 to the data before the update is executed, the database can be recovered to the state before the whole transaction is executed.

In an embodiment of the disclosure, the database program is damaged at the time point T2. The content of the data undo log of the time point T2 is the same to that of the data undo log of the time point T1, though since the transaction has been committed, the database is required to be recovered to the state that the data update commands u1, u2 and u3 have completed the updates, and since the data update command u2 has completed the update and the data update commands u1 and u3 do not complete the update, the data redo logs of the data update commands u1 and u3 are used to re-execute the data update commands u1 and u3, so as to recover the database to the state that the three update operations are all completed. In another embodiment of the disclosure, when the database program is damaged at the time point T2, the data pre-image in the data undo log of the data update command u2 can be first used to undo the data in the storage partition d13 of the first memory D1 to the data before the update is executed, and then the data redo logs of the data update commands u1, u2 and u3 are used to redo the three data update commands, by which the three data update commands are ensured to be completed.

In an embodiment of the disclosure, the database program is damaged at the time point T3. Since the transaction has been committed at such time point, the database is required to be recovered to the state that the data update commands u1, u2 and u3 have completed the updates. Since all of the updates have been updated to the first memory D1 through the database batch update method, it is unnecessary to perform any data undo or data redo operation after the database is recovered, and the database can be directly used. It should be noted that the aforementioned data undo log producing method and the database undo method are all applied to undo data of the first memory D1. In another embodiment of the disclosure, the aforementioned data undo log producing method and the data undo method can also be applied to undo data of the third memory D2. It should be noted that the aforementioned data undo log producing method and the data undo method are not limited to be applied to the database batch update method provided by the embodiment of the disclosure, for example, the aforementioned data undo log producing method and the data undo method can also be applied to the conventional data undo method of database batch update in which only a single hard disk is used to take charge of all types of the data access commands.

In brief, according to the aforementioned data redo/undo log producing method and data redo/undo method, when the data access commands are received, and the data access commands belonging to the first type command are stored in the memory queue of the storage partition of the second memory D2, only the corresponding data redo log is produced without producing the data undo log. The data undo log is produced only when the batch update of the specific storage partition is actually executed, and a data original state of specific storage partition is loaded to the fourth memory R2. According to the data redo/undo log producing method provided by the embodiment of the disclosure, in a non-synchronous manner, the data redo log is produced when the data update commands are stored in the memory queue and the data undo log including the data pre-image is produced only when the data is actually read. In this way, the required data undo operation can be implemented in the database updated in batch. Since data is not updated before the batch update is executed, if the data undo operation is required to be executed at such time point, it is unnecessary to use the actual data content, and after the batch update of data is executed, the data undo log has be produced, and the data undo operation can be implemented according to the data undo log, so as to undo the updated data to the data before the update is executed.

In summary, compared to the conventional database batch update method, in the database batch update method provided by the embodiments of the disclosure, when the data content is updated in batch, a data interleaving access manner is adopted to use another specific memory to execute the data access commands requiring to return data content in real-time. In this way, by using the database batch update method provided by the embodiments of the disclosure to update data in batch, a situation that the data access commands, for example, the data read command, etc. requiring to return data content in real-time influence the sequential access characteristic of the memory is effectively avoided, so as to effectively improve the efficiency of the database in batch update.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A database batch update method applicable to a data storage apparatus comprising a first memory, a second memory and a third memory, wherein the data batch update method comprises:
   sequentially receiving a plurality of data access commands, wherein the data access commands require to access data from the first memory, wherein the third memory is mirrored to the first memory before the data access commands are sequentially received;
   determining that a first subset of the data access commands belong to a first type and a second subset of the data access commands belong to a second type, wherein the data access commands belonging to the first type comprises commands that update data without returning it in real-time, and wherein the data access commands belonging to the second type command comprises commands that return data in real-time without updating it;
   storing the first subset of the data access commands in the second memory;
   sequentially updating the first memory according to the data access commands stored in the second memory in an order of physical addresses of the first memory;
   determining whether the data corresponding to the second subset of the data access commands needs to be updated by inspecting the data access commands stored in the second memory;
   if it is determined that the data corresponding to the second subset of the data access commands needs to be updated, updating and returning the data corresponding to the second subset of the data access commands according to the data access commands stored in the second memory; and
   if it is determined that the data corresponding to the second subset of the data access commands does not need to be updated, accessing and returning the data corresponding to the second subset of the data access commands from the third memory,
   wherein an access rate of sequential physical addresses in the first memory is larger than an access rate of random physical addresses in the first memory, and
   wherein an access rate of sequential physical addresses in the third memory is larger than an access rate of random physical addresses in the third memory.

2. The database batch update method as claimed in claim 1, wherein the data corresponds to at least one first storage partition of the first memory, wherein the step of storing the first subset of the data access commands in the second memory comprises:
   mapping the at least one first storage partition to at least one second storage partition of the second memory; and
   storing the first subset of the data access commands to the at least one second storage partition mapped to the at least one first storage partition corresponding to the first subset of the data access commands.

3. The database batch update method as claimed in claim 2, wherein the step of accessing and returning the data corresponding to the second subset of the data access commands from the third memory comprises:
   accessing the data according to the data access commands in the at least one second storage partition mapped to the at least one first storage partition corresponding to the second subset of the data access commands.

4. The database batch update method as claimed in claim 1, wherein the data access commands belonging to the first type comprises a write command, a modify command or an erase command.

5. The database batch update method as claimed in claim 1, wherein the data access command belonging to the second type comprises a read command.

6. The database batch update method as claimed in claim 1, wherein the first memory and the third memory are non-volatile memories, and the second memory is a volatile memory.

7. The database batch update method as claimed in claim 1, wherein the step of
   storing the first subset of the data access commands in a second memory comprises:
   producing a data redo log corresponding to the first subset of the data access commands,
   and wherein the step of sequentially updating the first memory according to the data access commands stored in the second memory in an order of physical addresses of the first memory comprises:
   producing a data undo log corresponding to the first subset of the data access commands.

8. The database batch update method as claimed in claim 7, wherein the data redo log comprises the first subset of the data access commands.

9. The database batch update method as claimed in claim 7, wherein the data undo log comprises the first subset of the data access commands and a data pre-image.

10. A data storage apparatus, comprising:
    a first memory, belonging to a non-volatile memory;
    a second memory, belonging to a volatile memory;
    a third memory, belonging to a non-volatile memory, wherein an access rate of sequential physical addresses in the first memory and the third memory is larger than an access rate of random physical addresses in the first memory and the third memory; and
    a processing unit, operatively coupled to the first memory, the second memory and the third memory, and configured to:
    sequentially receive a plurality of data access commands, and the data access commands require to access data from the first memory, wherein the third memory is mirrored to the first memory before the processing unit sequentially receives the data access commands;
    determine that a first subset of the data access commands belong to a first type and a second subset of the data access commands belong to a second type, wherein the data access commands belonging to the first type comprises commands that update data without returning it in real-time, and wherein the data access commands belonging to the second type comprises commands that return data in real-time without updating it;
    store the first subset of the data access commands in the second memory;
    sequentially update the first memory according to the data access commands stored in the second memory in an order of physical addresses of the first memory;

determine whether the data corresponding to the second subset of the data access commands needs to be updated by inspecting the data access commands stored in the second memory;

if it is determined that the data corresponding to the second subset of the data access commands needs to be updated, update and return the data corresponding to the second subset of the data access commands according to the data access commands stored in the second memory; and if it is determined that the data corresponding to the second subset of the data access commands does not need to be updated, access and return the data corresponding to the second subset of the data access commands from the third memory.

11. The data storage apparatus as claimed in claim 10, wherein the data corresponds to at least one first storage partition of the first memory, wherein when storing the first subset of the data access commands in the second memory, the processing unit is configured to:

map the at least one first storage partition to at least one second storage partition of the second memory; and store the first subset of the data access commands to the at least one second storage partition mapped to the at least one first storage partition corresponding to the first subset of the data access commands.

12. The data storage apparatus as claimed in claim 11, wherein the processing unit further accesses the data according to the data access commands in the at least one second storage partition mapped to the at least one first storage partition corresponding to the second subset of the data access commands.

13. The data storage apparatus as claimed in claim 10, wherein the data access commands belonging to the first type comprises a write command, a modify command or an erase command.

14. The data storage apparatus as claimed in claim 10, wherein the data access commands belonging to the second type comprises a read command.

15. The data storage apparatus as claimed in claim 10, wherein the processing unit further generates a data undo log corresponding to the data access commands.

16. The data storage apparatus as claimed in claim 15, wherein the data undo log comprises a data pre-image of the data access commands corresponding to the data undo log.

* * * * *